(12) United States Patent
Maupin

(10) Patent No.: US 6,600,917 B1
(45) Date of Patent: Jul. 29, 2003

(54) TELECOMMUNICATIONS NETWORK BROADCASTING OF SERVICE CAPABILITIES

(75) Inventor: Alain Maupin, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/411,383

(22) Filed: Oct. 4, 1999

(51) Int. Cl.$^7$ ................................................ H04M 3/42
(52) U.S. Cl. ....................... 455/414; 455/419; 455/552; 455/553
(58) Field of Search .................... 455/422, 426, 455/437, 438, 525, 552, 553, 551, 558, 414, 419, 466

(56) References Cited

U.S. PATENT DOCUMENTS

| | | |
|---|---|---|
| 4,692,945 A | 9/1987 | Zdunek |
| 5,063,494 A | 11/1991 | Davidowski et al. |

(List continued on next page.)

FOREIGN PATENT DOCUMENTS

| | | |
|---|---|---|
| EP | 0 715 423 A | 6/1996 |
| EP | 0 853 393 A | 7/1998 |
| EP | 0 854 588 A | 7/1998 |
| EP | 0 888 026 A2 | 12/1998 |
| EP | 0888026 A2 * | 12/1998 |
| EP | 0 946 076 A | 9/1999 |
| EP | 0 948 231 A | 10/1999 |
| FR | 2 790 632 A | 9/2000 |
| JP | 10-155173 A | 6/1998 |
| WO | 98/28931 A | 7/1998 |
| WO | 98/51103 | 11/1998 |
| WO | 98 58461 A | 12/1998 |
| WO | 99/43177 A1 | 8/1999 |
| WO | 99/43178 A1 | 8/1999 |
| WO | 00/36867 | 6/2000 |
| WO | 00/41429 | 7/2000 |
| WO | 01/20942 A1 | 3/2001 |

OTHER PUBLICATIONS

Technical Specification, 3$^{rd}$ Generation Partnership Project: Technical Specification Group Radio Access Network: RRC Protocol Specification (Release 1999), 3G TS 25.331 V3, 2.0 (2000–03).

(List continued on next page.)

*Primary Examiner*—Lester G. Kincaid
*Assistant Examiner*—Ronald J. Ward
(74) *Attorney, Agent, or Firm*—Nixon & Vanderhye, P.C.

(57) ABSTRACT

A network prepares a capabilities message which is broadcast by a base station to advise mobile user equipment units of services (radio access technology type, generation, and radio frequency band) supported by the base station. The capabilities message includes a bitmap which contains, for each potential service, a bit indicating whether that service is supported. In addition, the capabilities message contains preferred network identifiers. These preferred network identifiers correspond to the preferred network(s) available for each supported service. In addition, a handover requirements message provides the user equipment unit with a bitmap indicating the services for which the base station requires the user equipment unit to make handover measurements and reports.

28 Claims, 9 Drawing Sheets

U.S. PATENT DOCUMENTS

| | | |
|---|---|---|
| 5,164,938 A | 11/1992 | Jurkevich et al. |
| 5,241,685 A | 8/1993 | Bodin et al. |
| 5,267,261 A | 11/1993 | Blakeney, II et al. |
| 5,379,404 A | 1/1995 | Rasor |
| 5,404,355 A | 4/1995 | Raith |
| 5,457,780 A | 10/1995 | Shaw et al. |
| 5,487,174 A | 1/1996 | Persson |
| 5,574,728 A | 11/1996 | Mamaghani et al. |
| 5,594,718 A | 1/1997 | Weaver, Jr. et al. |
| 5,596,315 A | 1/1997 | Olds et al. |
| 5,634,192 A | 5/1997 | Meche et al. |
| 5,640,414 A | 6/1997 | Blakeney, II et al. |
| 5,673,259 A | 9/1997 | Quick |
| 5,697,055 A | 12/1997 | Gilhousen et al. |
| 5,697,097 A | 12/1997 | Reibel et al. |
| 5,706,290 A | 1/1998 | Shaw et al. |
| 5,715,419 A | 2/1998 | Szczepanek et al. |
| 5,740,239 A | 4/1998 | Bhagat et al. |
| 5,767,833 A | 6/1998 | Vanderwiele et al. |
| 5,774,465 A | 6/1998 | Lau et al. |
| 5,778,316 A | 7/1998 | Turcotte et al. |
| 5,825,774 A | 10/1998 | Ready et al. |
| 5,826,017 A | 10/1998 | Holzmann |
| 5,838,226 A | 11/1998 | Houggy et al. |
| 5,848,063 A | 12/1998 | Weaver, Jr. et al. |
| 5,870,673 A | 2/1999 | Haartsen |
| 5,878,033 A | 3/1999 | Mouly |
| 5,903,832 A | 5/1999 | Seppanen et al. |
| 5,929,776 A | 7/1999 | Warble et al. |
| 5,943,332 A | 8/1999 | Liu et al. |
| 5,995,836 A | 11/1999 | Wijk et al. |
| 5,999,811 A * | 12/1999 | Molne .................. 379/357.01 |
| 6,002,940 A | 12/1999 | Richter |
| 6,006,077 A | 12/1999 | Shull |
| 6,078,570 A | 6/2000 | Czaja et al. |
| 6,088,588 A | 7/2000 | Osborne |
| 6,091,949 A | 7/2000 | Sanchez |
| 6,111,864 A | 8/2000 | Kabasawa |
| 6,128,490 A * | 10/2000 | Shaheen et al. ............ 370/343 |
| 6,138,034 A | 10/2000 | Willey |
| 6,289,009 B1 | 9/2001 | Sato |

OTHER PUBLICATIONS

Technical Specification, $3^{rd}$ Generation Partnership Project (3GPP); Technical Specification Group (TSG) Radio Access Network; Radio Resource Management Strategies, 3G TR 25.992, V3.0.0 (1999–12).

Technical Specification, $3^{rd}$ Generation Partnership Projection; Technical Specification Group (TSG) RAN; Working Group 2 (WG2); RRC Protocol Specification (3G TS 25.331), version 3.0.0 release (1999–10).

U.S. patent application Ser. No. 09/314,019, filed May 19, 1999, entitled "Mobile Station Measurements With Event-Based Reporting".

U.S. patent application Ser. No. 09/344,122, filed Jun. 24, 1999, entitled "Network–Evaluated Handover Assisted By Both Mobile and Base–Stations".

U.S. patent application Ser. No. 09/344,121, filed Jun. 24, 1999, entitled "Power Control Based On Combined Quality Estimates".

U.S. patent application Ser. 09/262,346, filed Mar. 4, 1999, entitled "Coordinating Different Types of Messages Sent To Mobile Radios In A Mobile Communications Sytsem".

Technical Specification, $3^{rd}$ Generation Partnership Projection; Technical Specification Group Radio Access Network; Physical Layer –Measurements (FDD) (3G TS 25.215 version 3.1.0), 1999.

Technical Specification, $3^{rd}$ Generation Partnership Projection; Technical Specification Group Radio Access Network; Multiplexing and Channel Coding (FDD) (3G TS 25.212 version 3.1.0) 1999.

* cited by examiner

TELECOMMUNICATIONS NETWORK BROADCASTING OF SERVICE CAPABILITIES

BACKGROUND

1. Field of the Invention

The present invention pertains to cellular telecommunications, and particularly to determining the radio access technology types available in a cell of a telecommunications network.

2. Related Art and Other Considerations

Cellular telecommunications systems employ a wireless link (e.g., air interface) between the (mobile) user equipment and a base station (BS). The base station has transmitters and receivers for radio connections with numerous user equipment units. One or more base stations are connected (e.g., by landlines or microwave) and managed by a radio network controller (also known in some networks as a base station controller [BSC]). The radio network controller is, in turn, connected through control nodes to a core communications network. Control nodes can take various forms, depending on the types of services or networks to which the control nodes are connected. For connection to connection-oriented, switched circuit networks such as PSTN and/or ISDN, the control node can be a mobile switching center (MSC). For connecting to packet switching data services such as the Internet (for example), the control node can be a gateway data support node through which connection is made to the wired data networks, and perhaps one or more serving nodes.

Today for mobile radio user equipment units there are multiple radio access technology types. Current second generation radio access technology types include the Global System for Mobile communications (GSM), IS-136, IS-95, PDC, and AMPS. Each of these radio access technology types has distinguishing characteristics, such as (for example) differing protocols and differing frequency bands of operation. Moreover, some radio access technology types such as GSM service user equipment units operating in differing frequency bands (1450 MHz, 900 MHz, 1800 MHz, and 1900 MHz for GSM). The differing radio frequency bands may be assigned to different service providers or operators, for example.

A mobile user equipment unit operates in accordance with the particular radio access technology type(s) which it functionally supports. In other words, the radio access technology type(s) in accordance with which a user mobile equipment unit operates is dependent upon capabilities of that particular user equipment unit. Such capabilities concern, in addition to frequency band of operation, factors such as radio frequency power, encryption capability, and (if TDMA) time slot availabilty.

Typically, when a mobile user equipment unit is activated, the user equipment unit attempts to decode a common channel network message (BCCH) transmitted on a frequency band(s) supported by the user equipment unit. The mobile user equipment unit then attemps to use its home system information (such as mobile country code [MCC] and the mobile network code [MNC]) in order to register its location with its home location register (HLR).

The provision of additional services over wireless networks (such multimedia, for example) beckons a third generation of mobile telecommunication technology. With the advent of such services as mobile multimedia, a third generation counterpart will likely be developed for each radio access technology type. For example, a third generation for GSM will be known as UMTS; a third generation for IS-136 is expected to be labeled as "UWC-136"; a third generation for IS-95 may carry the designation "CDMA 2000". Such being the case, user equipment units of an entire matrix of user equipment radio access technology types and generations will emerge and be capable of roaming across telecommunications networks. The telecommunications networks themselves will be of diverse radio access technology types and generations.

Thus, there is the prospect of numerous mobile user equipment units (of differing radio access technology types and of differing generations within each type) roaming through telecommunications networks of differing radio access technology types and generations. This will make it complex, time-consuming, and difficult for a user equipment unit to scan all frequency bands, interpret all access technology types, detect and select networks, and finally determine a home network.

The fact of multiple radio access technology type and multiple generations within each type also presents handover problems from one cell to another cell, as not all cells may have the same capabilities (radio access technology types and generations). For example, there may be islands of a third generation UMTS cell in a GSM ocean, in which case a third generation UMTS user equipment may travel from a third generation cell into a second generation cell. Accordingly, in order to make the handover, such situation would have to be anticipated constantly with the third generation UMTS user equipment unit performing handover (e.g., power) measurements relative to frequencies for all generations, and reporting such measurements to a network that may or may not have the capabilities or the commercial rights to handover to these other networks. It would be preferable, if possible, to avoid continually performing handover measurements of an entire matrix of radio access technology types and generations.

Moreover, according to some present techniques, handover measurements are made at a time delay after a slot accorded to a connection. Handover measurements in a large amount of frequency bands would take too long, and could be at potentially conflicting times.

There has been speculation that a beacon frequency, emitted from a base station mutual to plural network operators, could be emitted to apprise all mobile user equipment units of the radio access technology types available in a cell. In accordance with this proposal, upon activation a mobile user equipment unit would first seek the beacon frequency, and from the beacon frequency determine what radio access technology types are available in a cell. However, the beacon frequency proposal requires existence of an independently operated base station, or at least a separate frequency dedicated to providing radio access technology type information.

What is needed, therefore, and an object of the present invention, is provision of a technique whereby a mobile user equipment unit can quickly determine the radio access technology types and generations available in a telecommunications cell.

BRIEF SUMMARY OF THE INVENTION

In accordance with the present invention, a base station broadcasts (e.g., in a BCCH message) a capabilities message which includes a supported service bitmap that is decoded by all user equipment units. For each service (e.g., radio access technology type and generation), the bitmap contains a bit indicating whether that radio access technology type and generation is available from the serving cell (i.e., confirming that coverage exists and selection or handover is possible). In addition, the capabilities message contains one or more preferred network identifiers (PNIs). For example, for GSM the preferred network identifiers can include the mobile country code (MCC) and the mobile network code (MNC) or some form of base station identity code (BSIC). These preferred network identifiers correspond to the preferred network(s) for each available radio access technology type and generation.

Upon receipt of the bitmap, the mobile user equipment unit scans the bitmap to find a radio access technology type and generation which it can utilize, and selects the preferred network, if possible. For the utilizable radio access technology type, the user equipment unit fetches the preferred network identifier from the BCCH broadcast message and uses the preferred network identifier for call set up and registering the location of the user equipment unit.

The present invention also address the handover situation by providing the user equipment unit with information to steer the handover measurements. A handover requirements message broadcast by the network provides the user equipment unit with a bitmap indicating the radio access technology types and generations for which the base station requires the user equipment unit to make handover measurements and reports. The handover requirements message can be on the same or similar channel as the capabilities message, or a specific handover message). Each base station controller or radio network controller knows the capabilities of adjacent base stations in its own network or co-operative networks. For example, for a given third generation base station or cell totally surrounded by third generation base stations, that base station or cell can broadcast (via the handover requirements message) a directive that the user equipments served by that base station or cell make handover measurements only on third generation frequencies. On the other hand, a third generation base station or cell that is at the edge of the third generation network coverage and has adjoining second generation cells, that third generation base station or cell can anticipate that user equipment units may move further toward or into the second generation cells. Therefore, the base station or cell will broadcast (e.g., via its handover requirements message) that user equipment units shall now make also second generation power measurements and reports for potential handover purposes.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
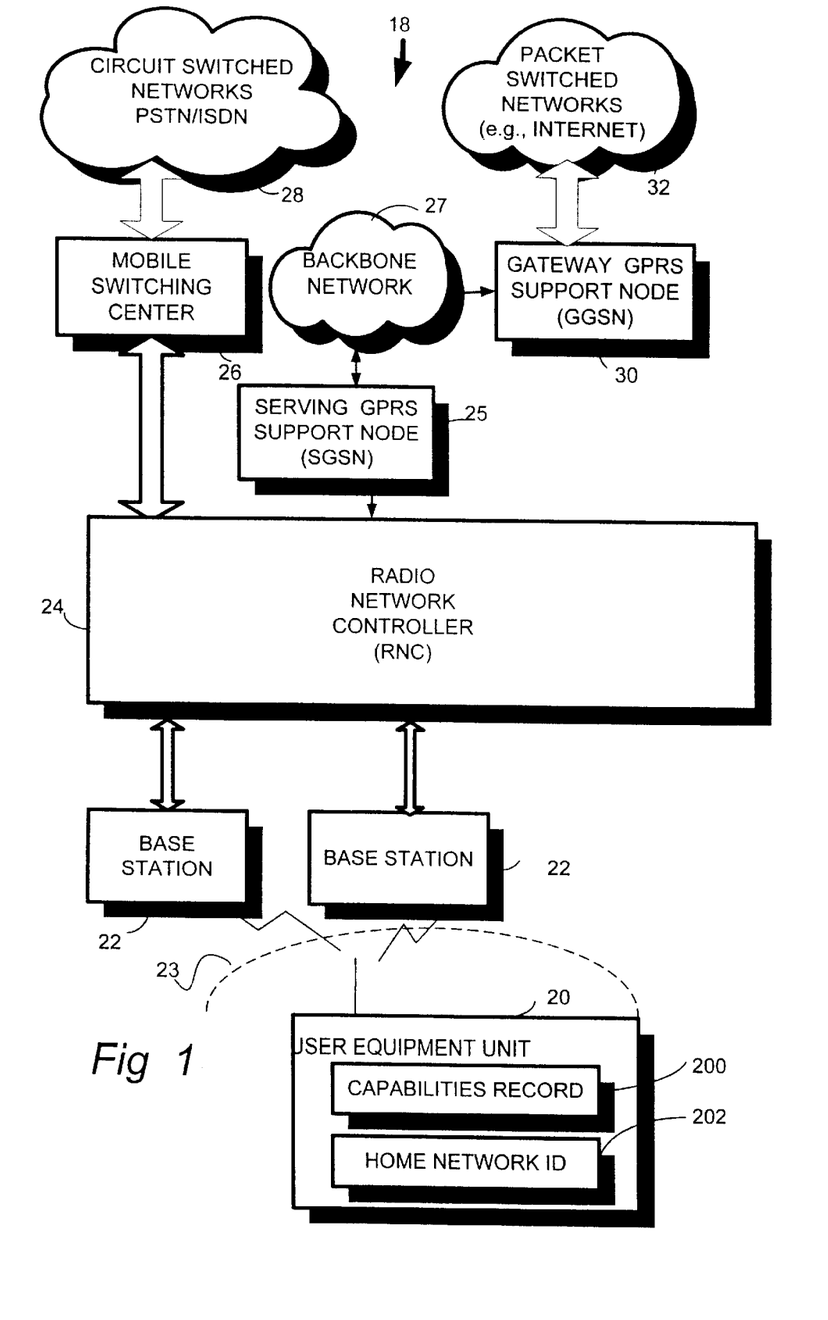
FIG. 1 is a schematic view of an embodiment of a telecommunications system which utilizes the present invention.

FIG. 1 shows a telecommunications network 18 in which a user equipment unit radio network controller (RNC) 24 [also known as a base station controller (BSC) in some networks]. The radio network controller (RNC) 24 is, in turn, connected through a control node known as the mobile switching center 26 to circuit-switched telephone networks (PSTN/ISDN) represented by cloud 28. In addition, radio network controller (RNC) 24 is connected to Serving GPRS Support Node (SGSN) 25 and through backbone network 27 to a Gateway GRPS support node (GGSN) 30, through which connection is made with packet-switched networks (e.g., the Internet, X.25 external networks) represented by cloud 32.

As understood by those skilled in the art, when user equipment unit 20 participates in a mobile telephonic connection, signaling information and user information from user equipment unit 20 are transmitted over air interface 23 on designated radio channels to one or more of the base stations 22. The base stations have radio transceivers which transmit and receive radio signals involved in the connection or session. For information on the uplink from the user equipment unit 20 toward the other party involved in the connection, the base stations convert the radio-acquired information to digital signals which are forwarded to radio network controller (RNC) 24. The radio network controller (RNC) 24 orchestrates participation of the plural base stations 22 which may be involved in the connection or session, since user equipment unit 20 may be geographically moving and handover may be occurring relative to the base stations 22. On the uplink, radio network controller (RNC) 24 picks frames of user information from one or more base stations 22 to yield a connection between user equipment unit 20 and the other party, whether that party be in PSTN/IDSN 28 or on the packet-switched networks (e.g., the Internet) 32.

Figure 2:
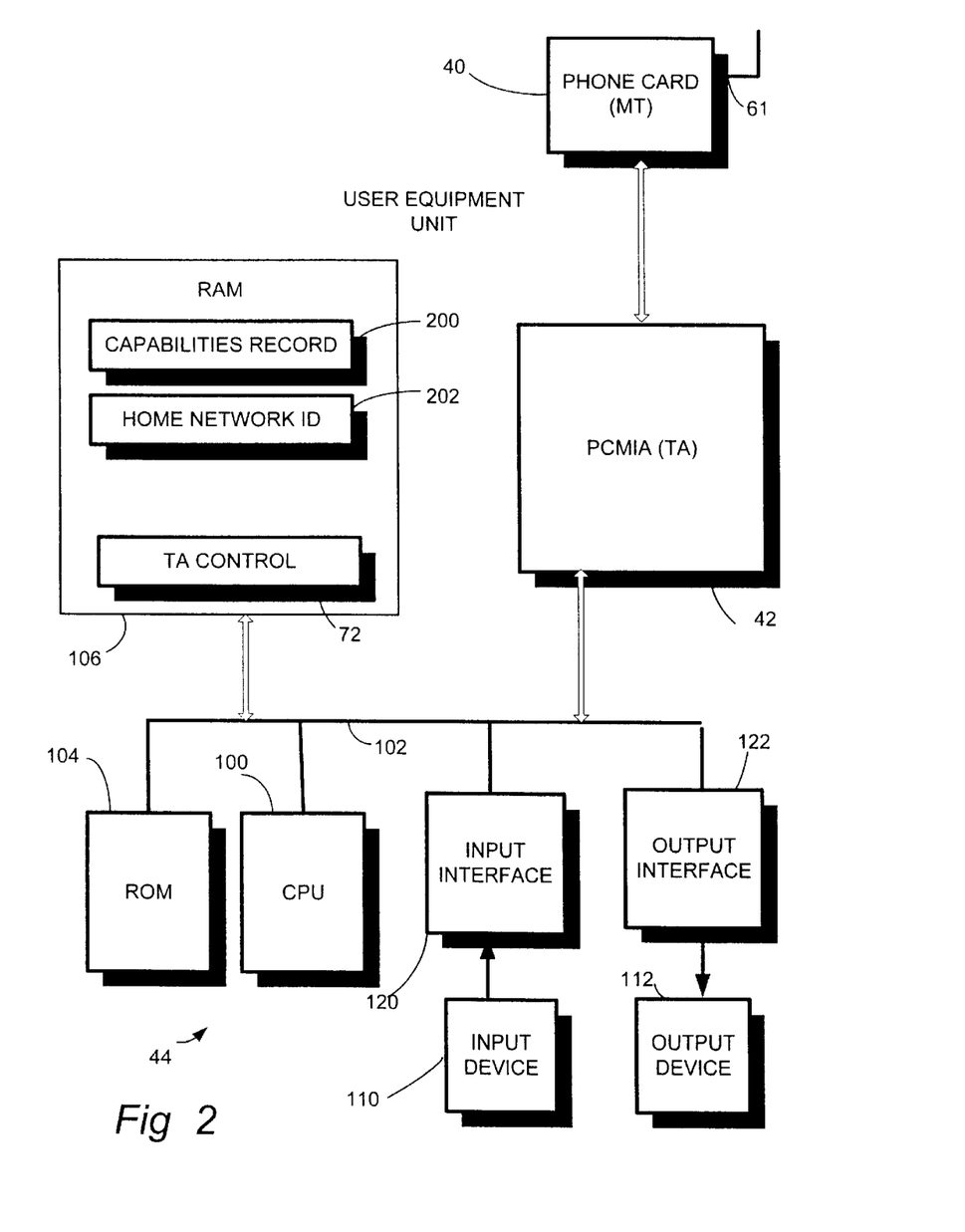
FIG. 2 is a diagrammatic view of a mobile user equipment unit which participates in the telecommunications system of FIG. 1.

An illustrative embodiment of a suitable user equipment unit 20 for the present invention is provided in FIG. 2. As shown in FIG. 2, user equipment unit 20 has the mobile termination entity (MT) 40; terminal adapter (TA) 42; and terminal equipment (TE) 44, each of which is discussed briefly hereafter.

Mobile termination entity (MT) 40, which is sometimes called the Mobile Equipment (ME), contains the radio transmitter/receiver (with antenna 61) and communications control toward the network, e.g., the setup and release of radio connections, handover, etc. Mobile termination entity (MT) 40 can be a standard mobile pocket telephone (e.g., a GSM phone) or a phone card within user equipment unit 20.

Terminal adapter (TA) 42 acts as an adaptation between mobile termination entity (MT) 40 and a set of applications executed by the terminal equipment. The terminal adapter (TA) 42 is typically realized as a Modem implemented on a PCMCIA (Personal Computer Memory Card International Association) card, which is inserted in a slot of terminal equipment 44.

Terminal equipment 44 is normally a small computer (or computer platform), and as such includes both hardware and software. Terminal equipment 44 thus has typical aspects of a computer platform, e.g., a processor with operating system and middleware (Internet protocol suits, for example). In addition, terminal equipment 44 has control logic 72 (executed by the processor) for controlling terminal adapter (TA) 42. Control logic 72 performs set-up and release of calls to and from the network 18. In essence, FIG. 2 shows terminal equipment 44 wherein mobile termination entity (MT) 40 and terminal adapter (TA) 42 are cards situated in card slots. Terminal adapter (TA) 42 is connected to central processing unit (CPU) 100 by bus 102. Mobile termination entity (MT) is connected to MT interface 65 of terminal adapter (TA) 42 by a cable. Memories of terminal equipment 44, particularly read only memory (ROM) 104 and random access memory (RAM) 106 are also connected to central processing unit (CPU) 100 by bus 102. Terminal equipment 44 interfaces with a user through input device(s) 110 and output device(s) 112, each connected through respective appropriate interfaces 120 and 122 to bus 102. Input device (s) 110 can be a keyboard and/or mouse, for example, while output device(s) 112 can take the form of a display device, such as a LCD display panel, for example.

It should be understood that the invention is not confined to user equipment units having the same physical separation between functional entities as shown in FIG. 2, and that the present invention can be implemented in other than the described functional/structural configuration.

In accordance with the present invention, the telecommunications network 18 prepares and broadcasts messages for enabling the mobile user equipment unit 20 to quickly and accurately determine what radio access technology types are available in a cell, and the generation(s) of the available radio access technology types. As explained subsequently in connection with FIG. 3A and FIG. 6, the telecommunications network 18 prepares and broadcasts a capabilities message (advising of the available radio access technology type and generations) which can be detected and decoded upon activation of the mobile user equipment unit 20. Further, as explained in connection with FIG. 3B and FIG. 7, for mobile user equipment units which are required to make measurements (such as power measurements) for handover purposes, the telecommunications network 18 prepares and broadcasts a handover requirements message which advises for which radio access technology types and generations the mobile user equipment unit 20 should make handover measurements.

As employed herein, "radio access technology" can include the concept of generation, e.g., some generations may be considered a new radio access technology type.
Capabilities Message As indicated by step 6-1 in FIG. 6, for a particular cell the telecommunications network 18 prepares a capabilities message for broadcast to at least one, and preferably all, mobile user equipment units in the cell. For example, in FIG. 3A a capabilities message is prepared by radio network controller (RNC) 24 for base station $22_1$. Base station $22_1$, transmits the capabilities message at least to mobile user equipment unit 20 situated within the cell served by base station $22_1$.

Figure 4A:
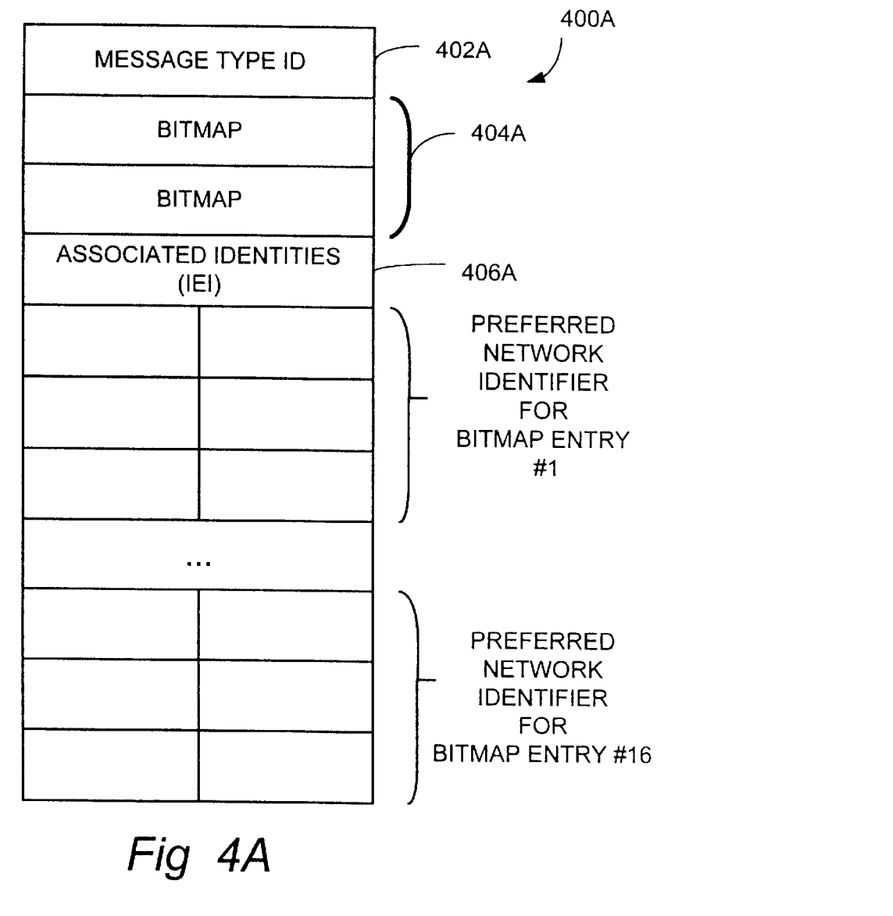
FIG. 4A is a diagrammatic view of an example format of a cell capabilities message according to an embodiment of the invention.

An example format of an example capabilities message 400A of the present invention is shown in FIG. 4A. Preferably the capabilities message 400A is broadcast on a common control channel, and is included in a message such as a BCCH message. Since there are various types of common control channel and/or BCCH messages, the format of capabilities message 400A of FIG. 4A begins with a message type identifier 402A. The capabilities message 400A includes a bitmap 404A which, in the illustrated embodiment comprises two bytes (e.g., two octets). The bitmap 404A is followed by a one byte information element identifier (IE) known as associated identities 406. The associated byte identities 406 serves to delineate the beginning of as many as sixteen preferred network identifier (PNI) fields. In the illustrated embodiment, each preferred network identifier (PNI) field comprises three bytes and is associated with a respective one of the bits in bitmap 404A.

Figure 5A:
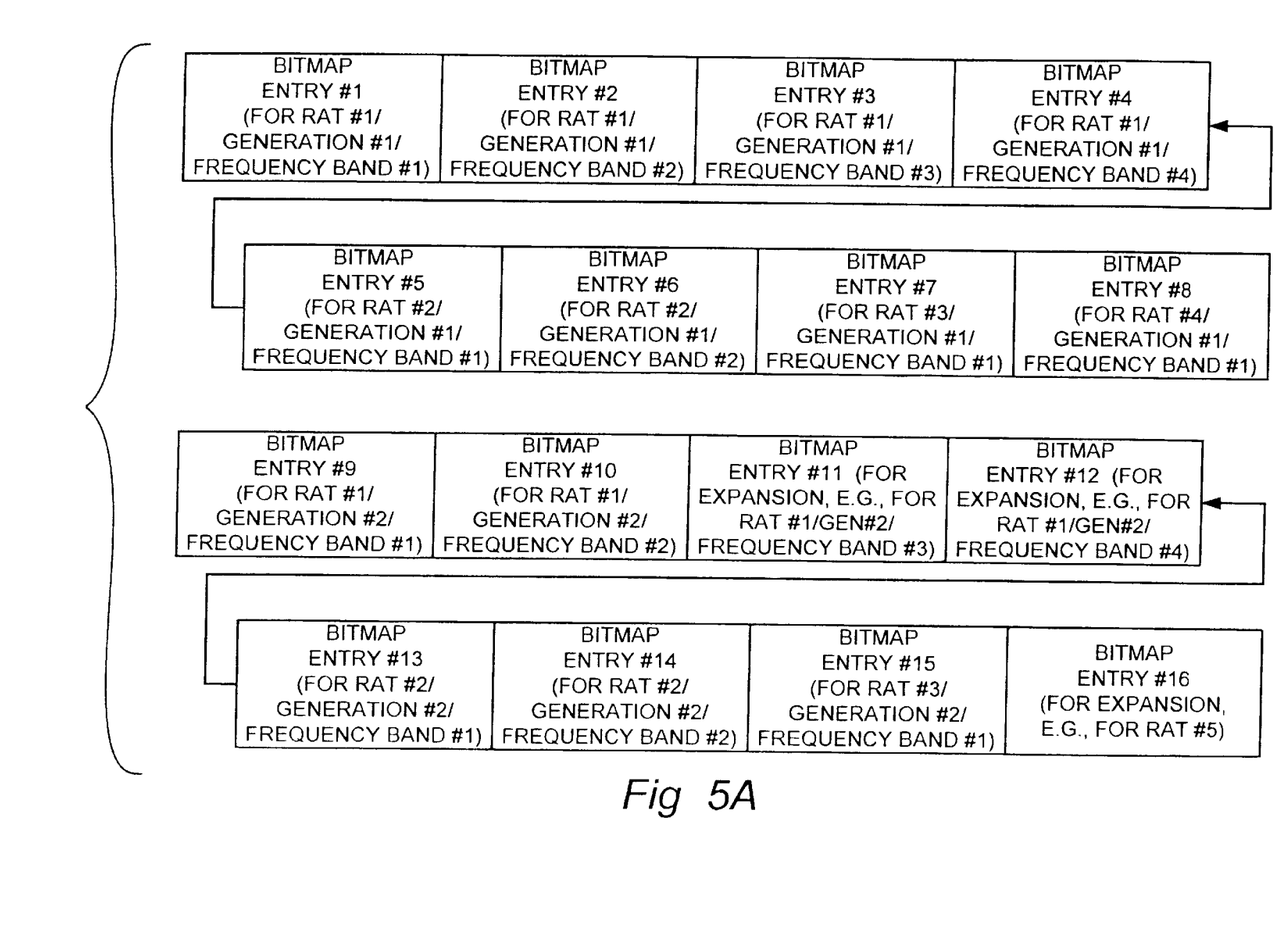
FIG. 5A is a diagrammatic view of an example generic format of a bitmap included in either the cell capabilities message of FIG. 4A or the handover requirements message of FIG. 4B.

An example of a generic format for bitmap 404A is illustrated in FIG. 5A. As mentioned above, in the illustrated embodiment bitmap 404A comprises two bytes, eight bits of the first byte of bitmap 404A being shown by respective blocks in the top half of FIG. 5A and eight bits of the second byte of bitmap 404A being shown by respective blocks in the bottom half of FIG. 5A. In the particular examples described herein, the first byte of bitmap 404A happens to pertains to a first generation of radio access technology types and frequency bands, while the second byte of bitmap 404A pertains to a second generation of radio access technology types and radio frequency bands. Moreover, each bit of bitmap 404A corresponds to a particular service described with reference to a radio access technology type, generation, and radio frequency band. The setting of a bit in bitmap 404A corresponding to a particular service (described with reference to a radio access technology type, generation, and radio frequency band) indicates that the service is supported by the cell from which the capabilities message is broadcast.

As shown in FIG. 5A, the example bitmap 404A provides a first generation of a first radio access technology type with four possible radio frequency bands. That is, the first four bits of bitmap 404A correspond to four possible radio frequency bands of the first generation of the first radio access technology type. The fifth and sixth bits of bitmap 404A are for a first generation of a second radio access technology type, and particularly for two radio frequency bands covered by such service. First generations of third and fourth radio access technology types are each accorded one radio frequency band each, as indicated by bits seven and eight of bitmap 404A.

Bits nine through sixteen of bitmap 404A are associated with second generations of the some of the radio access technology types involved in the first eight bits of bitmap 404A, as well as an expansion bit for a future radio access technology type. As employed herein, the term "first generation" and "second generation" are intended merely to mean differing generations of cellular telecommunications technology, and not necessarily "the" first generation and "the" second generation in absolute historical terms with respect to mobile telecommunications chronology. This is better understood in the context of the specific example illustrated in FIG. 3B, wherein it will be understood that the terminology "first generation" actually refers to the historical second generation and the "second generation" refers to the third historical generation.

Figure 5B:
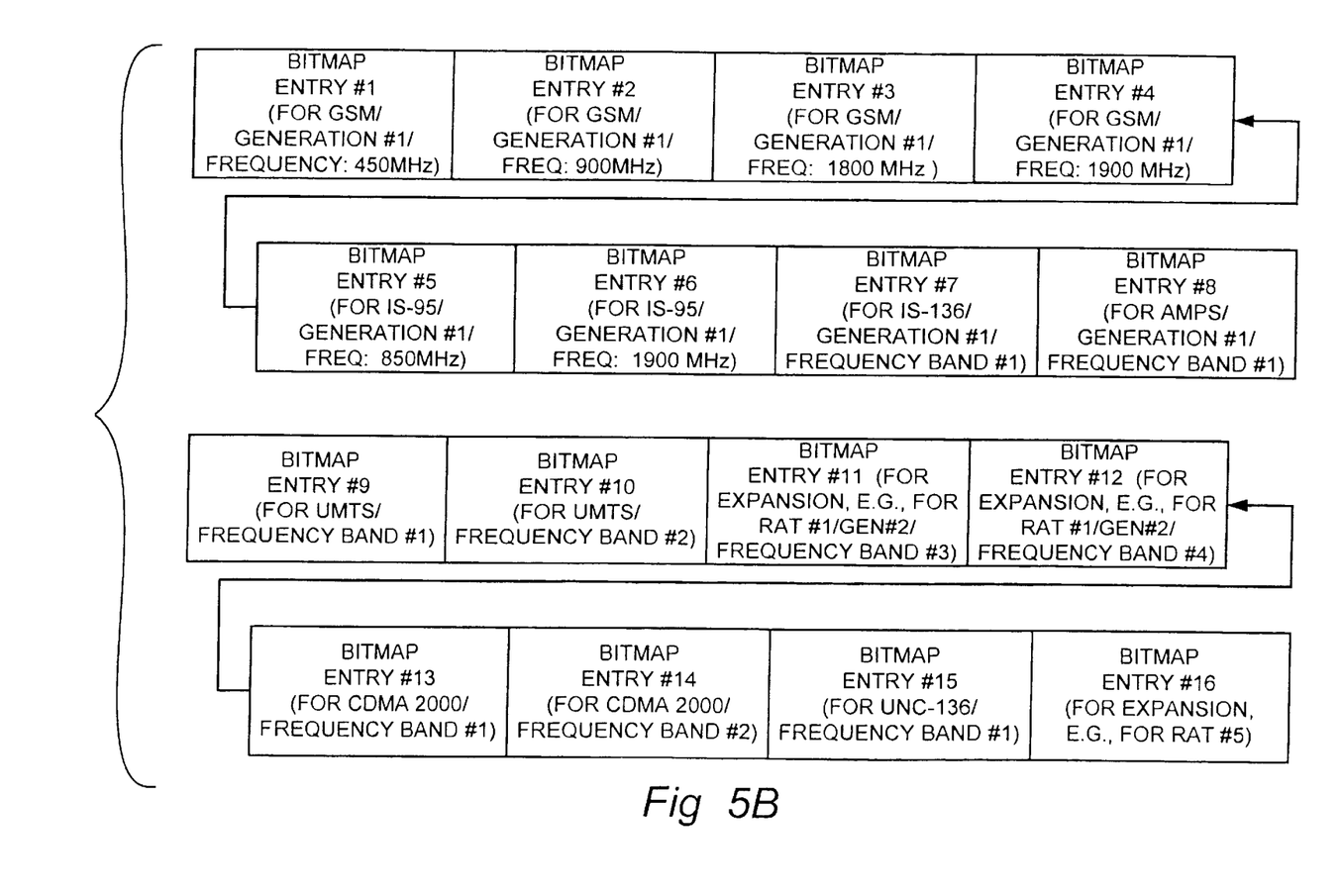
FIG. 5B is a diagrammatic view showing an example specific format of a bitmap included in either the cell capabilities message of FIG. 4A or the handover requirements message of FIG. 4B.

In FIG. 5B, for example, the first radio access technology type is GSM, which covers as many as four radio frequency bands and is known as a second generation service. In this regard, the first four bits of bitmap 404A correspond to the four potential radio frequency bands of the first generation GSM: 450 MHz, 900 MHz, 1800 MHz, and 1900 MHz, respectively. The fifth and sixth bits of bitmap 404A are for IS-95, with its two possible radio frequency bands of 850 MHz and 1900 MHz. The seventh and eighth bits of bitmap 404A are for IS-136 and AMPS, respectively.

The bitmap 404A in FIG. 5B also has a second byte which, as mentioned before, has bits for second generations of the some of the radio access technology types involved in the first eight bits of bitmap 404A, as well as an expansion bit for a future radio access technology type. For example, since UMTS is the next generation of GSM (and thus, historically, a third generation), bits nine through twelve of bitmap 404A are shown as being allocated to UMTS, e.g., to the second generation of the first radio access technology type (GSM). Since only two frequency ranges are presently allocated for UMTS (e.g., a paired frequency band and an unpaired frequency band), only bits nine and ten of the bitmap 404A are actually associated with frequency bands initially. However, as indicated by bits eleven and twelve of bitmap 404A, the bitmap 404A offers the possibility of expansion in the event that UMTS is offered on yet other frequency bands. Similarly, bits for each next generation radio access technology type (CDMA 2000, UWC-136), are allocated in the last half of the second byte of bitmap 404A. Since AMPS (being analogue) is not expected to have a second generation, bit sixteen of bitmap 404A is left for expansion, and may be utilized in the future by yet another radio access technology type.

In view of the foregoing, it should be understood that the bitmap 404A of the capabilities message of the present invention is not confined to a length of two bytes, nor is the bitmap 404A of the capabilities message confined to two successive generations. More than two generations may be encompassed by the bitmap 404A of the capabilities message. Similarly, the bitmap 404A of the capabilities message is not limited to one byte per generation, as a greater or lesser number of bytes can be provided per generation as required. The bitmap 404A can be expanded, by the inclusion of a flag or the like which indicates that additional octets are added to bitmap 404A with additional information for other radio access types and/or generations.

As illustrated in FIG. 4A, the capabilities message 400 also includes as many as sixteen preferred network identifier (PNI) fields. Each preferred network identifier (PNI) field is three bytes in the example of FIG. 4A, and corresponds to one of the bits in bitmap 404A of capabilities message 400A. For example, the first preferred network identifier (PNI) field of capabilities message 400A corresponds to the first bit in bitmap 404A, i.e., to the particular service characterized as the first generation of the first radio access technology type in its first radio frequency band (see FIG. 5A). Only the preferred network identifier (PNI) fields of capabilities message 400A for which the corresponding radio access technology type/generation/radio frequency band is supported have non-null contents.

In context of the example of FIG. 5B, wherein the first radio access technology type is GSM and the first radio frequency band is 450 MHz, the first preferred network identifier (PNI) field includes both a mobile country code [MCC] and a mobile network code [MNC]). Specifically, in the illustrated example, the first byte of the first preferred network identifier (PNI) field begins with the second digit (four bits) of the MCC and ends with the first digit (four bits) of the MCC; the second byte of the first preferred network identifier (PNI) field contains a four bit filler (or, alternatively, the third digit of MNC) and ends with the third digit (four bits) of the MCC; the third byte of the first preferred network identifier (PNI) field begins with the second digit (four bits) of the MNC and ends with the first digit (four bits) of the MNC. Thus, for any GSM radio frequency bands supported by the cell, for such radio frequency bands the capabilities message 400A will have contents of its associated preferred network identifier (PNI) field similarly stored with an appropriate MCC and MNC value.

Figure 3A:
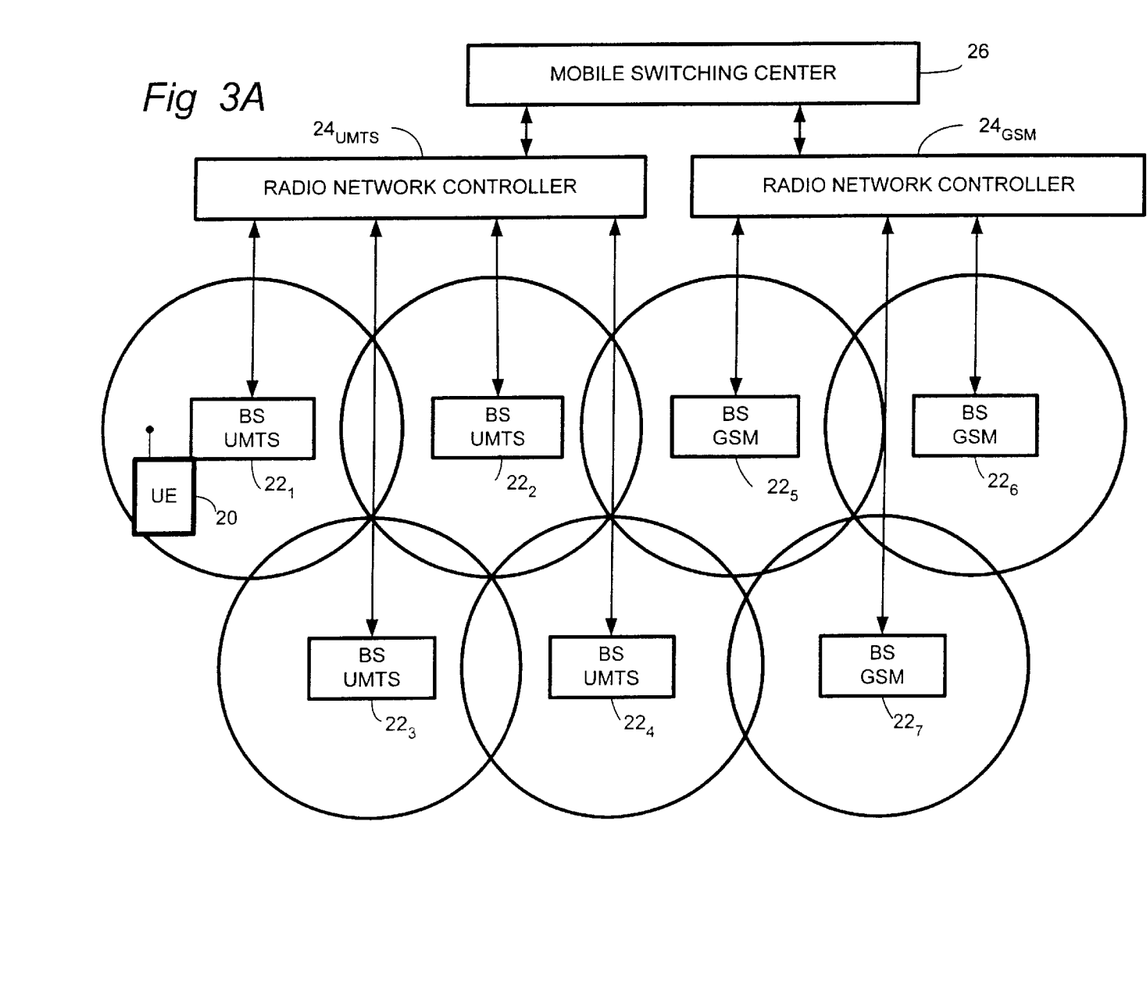
FIG. 3A and FIG. 3B are schematic drawings of a telecommunications network having plural radio access technology types/generations, FIG. 3A illustrating activation of a mobile user equipment unit and FIG. 3B showing movement of the mobile user equipment unit.

Thus, as mentioned above, the radio network controller (RNC) 24 prepares the capabilities message for a cell which is sent to the base station for that cell. In the example of FIG. 3A, separate capabilities messages are prepared and sent to each base station by the particular radio network controller (RNC) 24 which controls the base station. Although the format of the capabilities message is preferably the same for each base station, the content of the capabilities message varies from base station to base station in accordance with the capabilities of the base station and its surrounding environment (e.g., the radio access technology type and generations supported by the base station).

Figure 6:
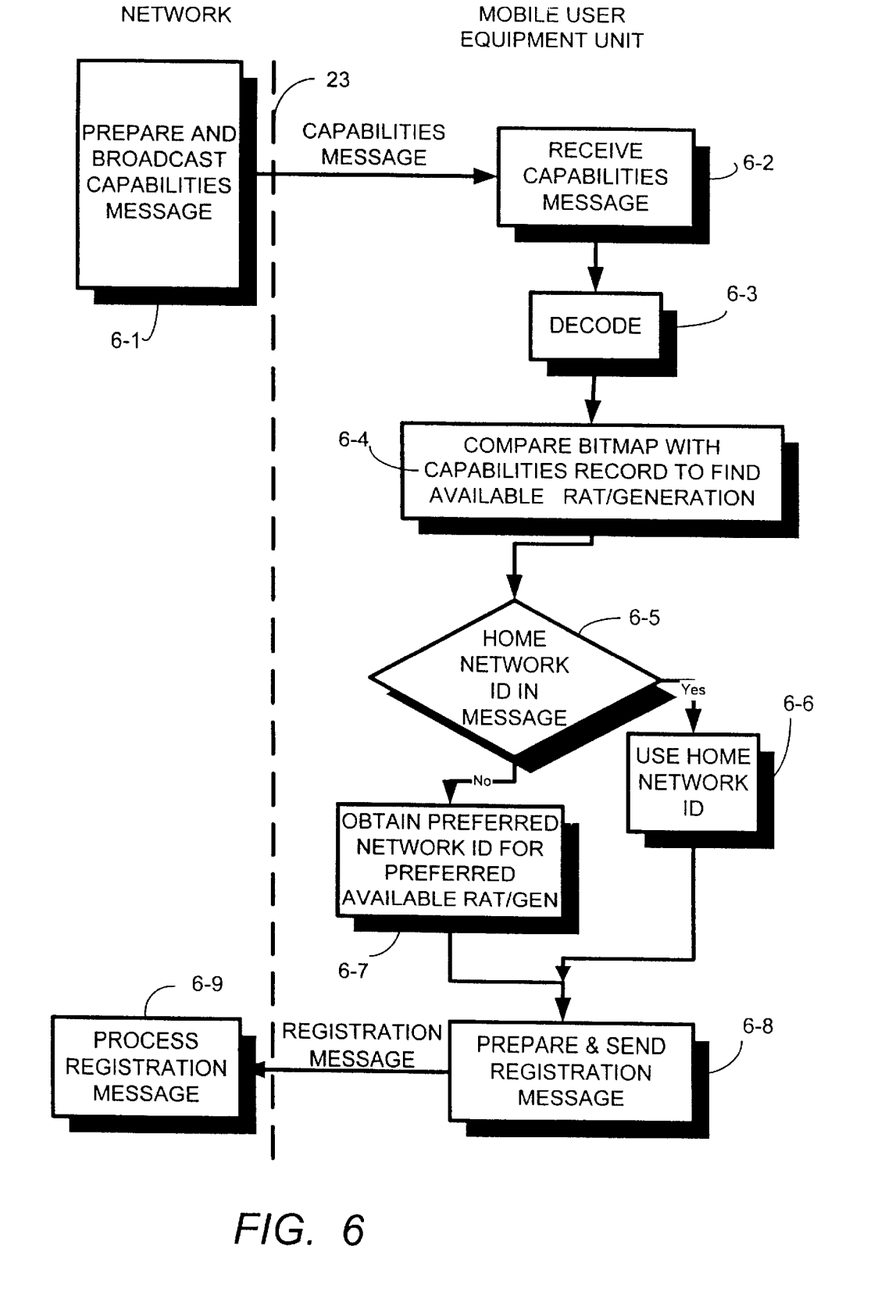
FIG. 6 is a flowchart showing a method of the invention wherein a network prepares and broadcasts a cell capabilities message which is processed by a mobile user equipment unit.

FIG. 6 shows the capabilities message being broadcast from base station 22₁ to mobile user equipment unit 20. Upon reception of the capabilities message (step 6-2), mobile user equipment unit 20 decodes the capabilities message (step 6-3). Whenever mobile user equipment unit 20 is activated, mobile user equipment unit 20 first seeks control information broadcast by the base station in the cell in which mobile user equipment unit 20 is situated, including the capabilities message. After activation, the mobile user equipment unit 20 periodically receives the capabilities message broadcast from the base station serving the cell in which mobile user equipment unit 20 is located.

At step 6-4, mobile user equipment unit 20 compares the bitmap 404A of the capabilities message with a capabilities record stored in mobile user equipment unit 20. In this regard, and as illustrated in FIG. 2, RAM 72 of mobile user equipment unit 20 stores capabilities record 200 for mobile user equipment unit 20. The capabilities record 200 includes the same type of information as stored in bitmap 404A, and in the illustrated embodiment has the same format as bitmap 404A. By knowing the format of bitmap 404A, and by comparing the bits set in bitmap 404A with the bits set in its own capabilities record 200, mobile user equipment unit 20 can determine which of the services it supports is also supported by the cell in which mobile user equipment unit 20 is currently situated.

For example, if mobile user equipment unit 20 were a UMTS unit capable of operating either as a GSM unit at 1900 MHz or as an UMTS unit at UMTS frequency band #1, the contents of its capabilities record 200 would be 00010000 10000000 (see FIG. 5B, and assuming the format of the home network identifier 202 is the same as bitmap 404A). If mobile user equipment unit 20 were in the cell serviced by base station 22₁, and the service provider in such cell supports both GSM at both 900 MHz and 1900 MHz and UMTS at its first frequency band, the first bitmap 404A in capabilities message would be 01010000 10000000. Thus, by comparison of the capabilities record 200 of mobile user equipment unit 20 with the bitmap 404A of the capabilities message, mobile user equipment unit 20 can conclude that it can operate at either of 1900 MHz or the first UMTS frequency band in the cell of base station $22_1$.

At step 6-5 mobile user equipment unit 20 analyzes the preferred network identifier (PNI) fields in capabilities message for which a corresponding bit has been set in bitmap 404A. In particular, at step 6-5 mobile user equipment unit 20 searches the preferred network identifier (PNI) fields corresponding for set bits, seeking in such preferred network identifier (PNI) fields the home network identifier of the mobile user equipment unit 20. As shown in FIG. 2, the home network identifier 202 is stored in RAM 106 of mobile user equipment unit 20. If mobile user equipment unit 20 finds in one of the active preferred network identifier (PNI) fields of capabilities message 400A the same home network identifier 202 which is stored in mobile user equipment unit 20, at step 6-6 the mobile user equipment unit 20 can select its home network identifier 202 for use in preparation of a registration message to the network.

If mobile user equipment unit 20 does not find, in one of the active preferred network identifier (PNI) fields of capabilities message 400A, the same home network identifier 202 which is stored in mobile user equipment unit 20, at step 6-7 the mobile user equipment unit 20 determines which of the services available in the cell the mobile user equipment unit 20 supports and prefers to use. In other words, at step 6-7 mobile user equipment unit 20 selects, from the services having bits set in capabilities message 400A, a service which mobile user equipment unit 20 supports. In this sense, "service" is described by one or more of radio access technology type, generation, and radio frequency band. In the case in the cell provides plural services, more than one of which is supported by mobile user equipment unit 20, the mobile user equipment unit 20 can selected which of the services is preferred by the mobile user equipment unit 20.

Moreover, as part of step 6-7, the mobile user equipment unit 20 obtains the preferred network identifier (PNI) for the selected service. If mobile user equipment unit 20 is unable to use its home network identifier, the mobile user equipment unit 20 uses the preferred network identifier (PNI) for the selected service in the preparation and transmission of a registration message to the network. Preparation and transmission of the registration message is depicted by step 6-8 in FIG. 6.

If the mobile user equipment unit 20 is unable to find a supporting service in the capabilities message 400A, the mobile user equipment unit 20 can scan for other services and attempt to attempt to register with such other service as long as it is not forbidden (e.g., by a SIM card of the mobile user equipment unit 20). If no home network, or preferred network, or non-forbidden network is found, the mobile user equipment unit 20 is relegated only to placing certain approved calls, e.g., an emergency call or the like.

Handover Requirements Message

Figure 4B:
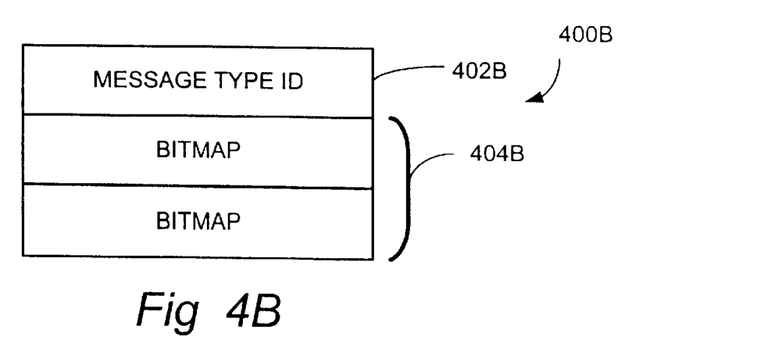
FIG. 4B is a diagrammatic view of an example format of a handover requirements message according to an embodiment of the invention.

The present invention also provides for a handover requirements message which is transmitted from a base station of the telecommunications network 18 to mobile user equipment unit 20. As with capabilities message 400A, the handover requirements message 400B is preferably transmitted over a common control channel, and thus is transmitted to plural mobile user equipment units in the cell served by the base station from which handover requirements message 400B emanates. An example format of handover requirements message 400B is illustrated in FIG. 4B. The handover requirements message 400B begins with a message type identifier 402B in its first byte, which signifies that the message is a handover requirements message 400B. The handover requirements message 400B can be included in a common control channel used for other purposes, e.g., a BCCH message, or another common control channel. Alternatively, the handover requirements message 400B of the present invention can be carried on a dedicated channel and thus directed to fewer than all mobile user equipment units in a given cell.

The handover requirements message 400B also includes a bitmap 404B, which can have the same format as bitmap 404A described in FIG. 5A and FIG. 5B. However, the contents of the bitmap 404B broadcast for a given cell may differ from the contents of the bitmap 404B broadcast from the same cell. In this regard, the setting of the bit in bitmap 404B is for the purpose of requesting that the recipient mobile-user equipment unit 20 make handover measurements with regard to the particular service (e.g., radio access technology type/generation/radio frequency band) associated with the bit.

Figure 3B:
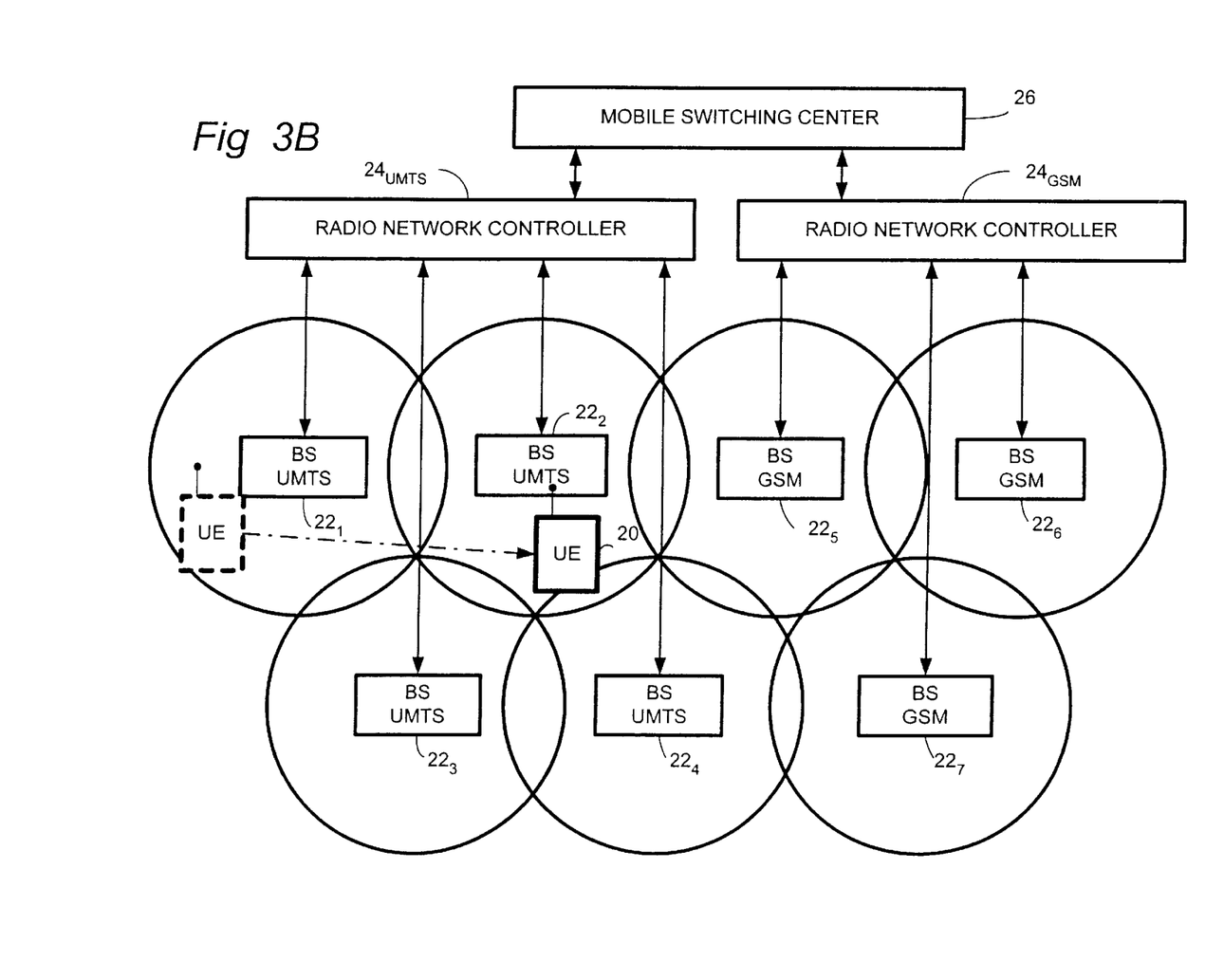
Figure 7:
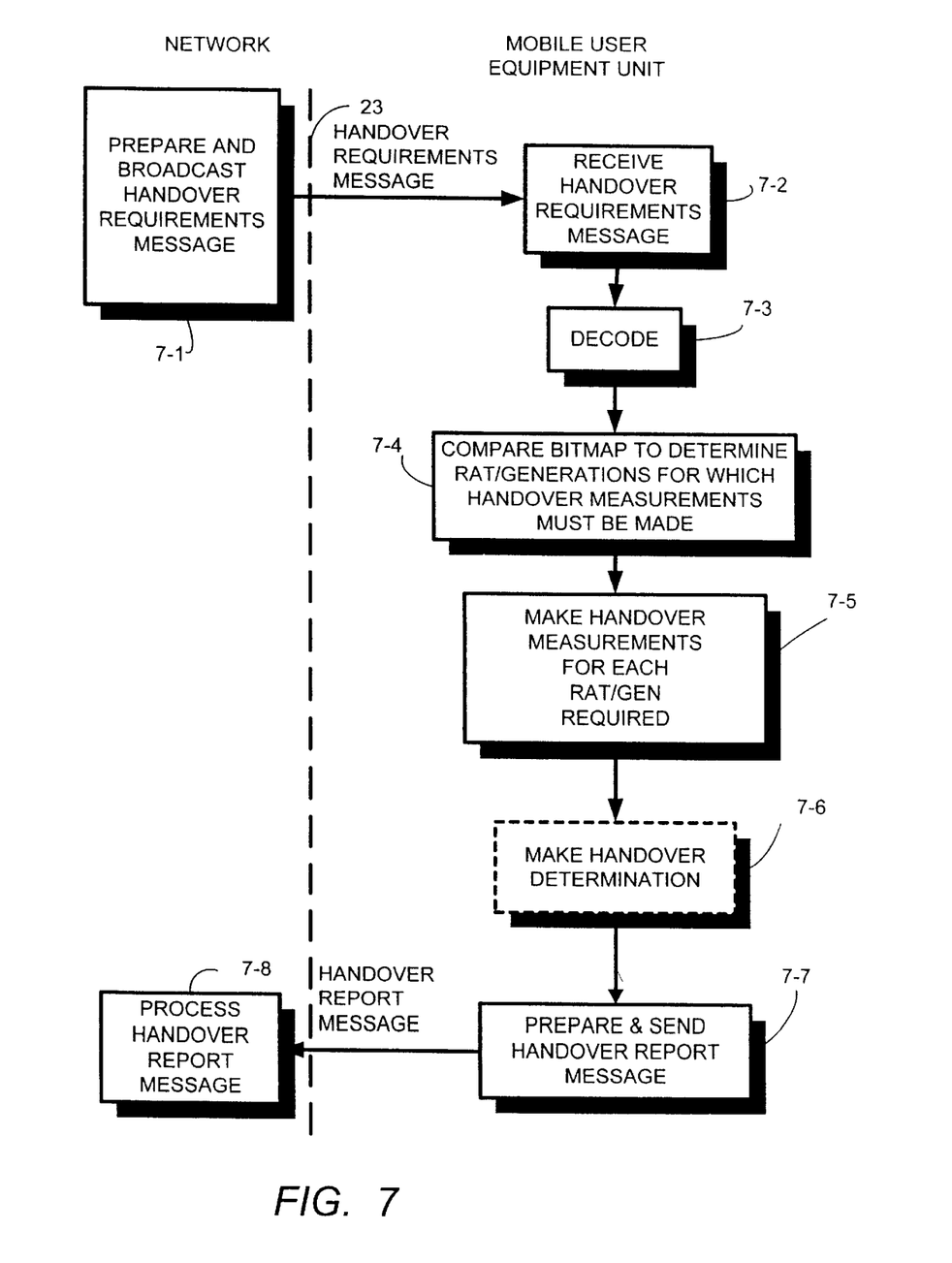
FIG. 7 is a flowchart showing a method of the invention wherein a network prepares and broadcasts a handover requirements message which is processed by a mobile user equipment unit.

Differing scenarios depicting usage of the handover requirements message of the present invention is provided with respect to FIG. 3A and FIG. 3B, both in the context of the steps of operation illustrated in FIG. 7. At the time shown in FIG. 3A, mobile user equipment unit 20 is situated within a cell served by base station $22_1$. As previously described, in this example mobile user equipment unit 20 is a UMTS unit which operates at the UMTS first frequency band. In view of the fact that the cell served by base station $22_1$ is essentially completely surrounded by other cells which also provide UMTS at the UMTS first frequency band (e.g., the cells served by base stations $22_2$–$22_4$), there is no need for mobile user equipment unit 20 to make handover measurements with respect to any service except UMTS at the UMTS first frequency band.

In accordance with the foregoing, at step 7-1 of FIG. 7 radio network controller (RNC) $24_{UMTS}$ prepares a handover requirements message (such as that illustrated in FIG. 4B) which is transmitted by base station $22_1$, to mobile user equipment unit 20. The particular handover requirements message sent at step 7-1 includes a bitmap 404 having contents as follows: 00000000 10000000. Note that the bitmap 404B in the handover requirements message from base station $22_1$ has less bits set than does bitmap 404A of the capabilities message, since base station $22_1$ should not require the UMTS user equipment unit serviced thereby to make handover measurements with respect to earlier generation (e.g., GSM) services. The handover requirements message typically is not received on the same channel (e.g., BCCH) for differing generations (e.g., for both GSM and UMTS), but for differing generations is a different message (whether sent from the same base station with dual capability or another base station in the same area).

At step 7-2 the mobile user equipment unit 20 receives the handover requirements message 400B, and then decodes the handover requirements message at step 7-3. At step 7-4, mobile user equipment unit 20 compares the bitmap 404 received in the handover requirements message 400B with its capabilities record 200, described above (see FIG. 2). As a result of the comparison, at step 7-5 mobile user equipment unit 20 makes handover measurements for the services having corresponding bits set in bitmap 404B of handover requirements message 400B. In the example, illustrated, the mobile user equipment unit 20 will thus make handover measurements for the UMTS first frequency band. Incidentally, if the radio access technology type has plural possible supported frequency bands, and if the mobile user equipment unit 20 is set to prefer only one of the supported radio frequency bands, upon a determination at step 7-5 that it has been directed to make a handover measurements for its preferred radio frequency band, the mobile user equipment unit 20 may make the handover measurements only with respect to its preferred radio frequency band. As a further alternative, if after making the handover measurements for its preferred radio frequency band, the mobile user equipment unit 20 finds such handover measurements to be inadequate, the mobile user equipment unit 20 has the option of also making handover measurements with respect to other radio frequency bands which it supports.

The handover measurements of step 7-5 are well known to those skilled in the art, and accordingly are not described in detail. Preferably the handover measurements involve ascertaining received power from the various base stations 22 from which mobile user equipment unit 20 can receive transmissions, for the purpose of determining whether the base station 22 currently serving the mobile user equipment unit 20 should continue to do so, or whether a switch to be made to another base station 22.

Step 7-6 of FIG. 7 shows a mobile user equipment unit making its own handover determinations, based on the handover measurements obtained at step 7-5. Since not all mobile user equipment units may have such a capability of making its own handover determination, step 7-6 is optional and therefore shown in phantom lines.

At step 7-7 the mobile user equipment unit 20 prepares and sends a handover report message to the telecommunications network 18. The handover report message includes the results of the handover measurements performed at step 7-5, and any handover determinations made at step 7-6. The handover report message is received at the base station $22_1$, and processed by the network as reflected by step 7-8 in FIG. 7. If any handover operation is required as a result of information contained in the handover report message, the handover operation is performed using techniques well known to those skilled in the art.

Having described the scenario of FIG. 3A, suppose now that the mobile user equipment unit 20 has traveled to the position shown in FIG. 3B. In FIG. 3B, the mobile user equipment unit 20 is served by base station $22_2$. The radio network controller (RNC) $24_{UMTS}$ that controls base station $22_2$ knows the topology of the overall telecommunications network 18, and thus realizes that mobile user equipment unit 20 could well be moving toward a cell served by base station $22_5$. Unlike the cells served by base stations $22_1$–$22_4$, in the cell served by base station $22_5$ UMTS is not supported. That is, while GSM is supported in the cell served by base station $22_5$, the next generation of the kindred service (UMTS) is not yet available.

In view of the possibility that mobile user equipment unit 20 may roam into the cell served by base station $22_5$, the handover requirements message prepared for and transmitted by base station $22_2$ differs in content (but not format) for that prepared for base station $22_1$. In this regard, the handover requirements message 400B transmitted from base station $22_2$ requires that handover measurements be made at step 7-5 for both UMTS service and GSM service. In other words, the bitmap 404B for the handover requirements message 400B transmitted by base station $22_2$ has the following content: 01010000 10000000. The handover requirements message 400B transmitted by base station $22_2$ thus prepares mobile user equipment unit 20 for a possible handover to the cell served by base station $22_5$, by having mobile user equipment unit 20 make handover measurements not only for the services provided in the cell served by base station $22_2$, but also for the lower generation service for which mobile user equipment unit 20 must settle should mobile user equipment unit 20 enter the cell served by base station $22_5$.

In the illustrated embodiments, the capabilities record 200 and home network identifier 202 are shown as being stored in RAM 106 of mobile user equipment unit 20. Storage in RAM 106 provides flexibility so that, if the capabilities of the mobile user equipment unit 20 are changed, capabilities record 200 and home network identifier 202 can also be easily changed. However, it should be understood that such information as capabilities record 200 and home network identifier 202 can be stored elsewhere, as in ROM 104, for example.

While a combination of MCC and MNC have been illustrated as one type of preferred network identifier (PNI), it should be understood that other information may be similarly utilized for preferred network identifier (PNI), such as base station identifier, for example.

Moreover, it should be realized that provision can be made in the messages of the present invention for emergency access, as previously described.

The present invention thus provides messages, such as the capabilities message and the handover requirements message, which succinctly and efficiently advise the mobile user equipment unit 20 regarding services in the prevailing cell or an anticipated cell to which mobile user equipment unit 20 may be handed over. In so doing, the messages, methods, and equipment of the present invention spare the mobile user equipment unit 20 from having to conduct protracted scans or investigations in search of a radio access technology type, generation, or radio frequency band compatible with the capabilities of the mobile user equipment unit 20. Moreover, the present invention affords a service provider in a cell with an opportunity to steer mobile user equipment unit 20 to preferred networks with which the service provider may have an affiliation.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A mobile telecommunications network having a node which broadcasts a capabilities message over an air interface, the capabilities message being formatted with plural service support fields for each of corresponding plural services so that a mobile user equipment unit can ascertain therefrom which one(s) of plural services are supported by the node;
   each of the plural services being defined with reference to at least one of radio access technology type, generation, and radio frequency band,
   the capabilities message further being formatted to provide for each of the service support fields a corresponding preferred network identifier field.

2. The apparatus of claim 1, wherein the message includes entries for plural services, each entry indicating one of support and non support for a respective service.

3. The apparatus of claim 2, wherein the entries for the plural services are in a predefined order.

4. The apparatus of claim 2, wherein for at least one of plural radio access technology types the message includes a first generation entry and a second generation entry, the first generation entry indicating whether a first generation of the at least one of the plural radio access technology types is supported by the node, the second generation entry indicating whether a second generation of the at least one of the plural radio access technology types is supported by the node.

5. The apparatus of claim 2, wherein for at least one of the plural radio access technology types the message includes a first frequency entry and a second frequency entry, the first frequency entry indicating whether a first frequency band of the at least one of the plural radio access technology types is supported by the node, the second frequency entry indicating whether a second frequency band of the at least one of the plural radio access technology types is supported by the node.

6. The apparatus of claim 1, wherein the preferred network identifier includes one of mobile country code and the mobile network code.

7. The apparatus of claim 1, wherein the message is transmitted on a common broadcast channel.

8. The apparatus of claim 7, wherein the message is a BCCH message.

9. The apparatus of claim 1, wherein the message includes a bitmap which has an entry for each of the plural services, each entry in the bitmap indicating one of support and non support for a respective service.

10. A mobile user equipment unit which communicates over an air interface with a telecommunications network, the mobile user equipment unit being configured to receive a message from the telecommunications network, the message being formatted with plural service support fields for each of corresponding plural services so that a mobile user equipment unit can ascertain therefrom which one(s) of plural services are supported by the node;

each of the plural services being defined with reference to at least one of radio access technology type, generation, and radio frequency band, the capabilities message further being formatted to provide for each of the service support fields a corresponding preferred network identifier field.

11. The apparatus of claim 10, wherein the message includes entries for plural services, each entry indicating one of support and non support for a respective service.

12. The apparatus of claim 11, wherein the entries for the plural radio access technology types are in a predefined order.

13. The apparatus of claim 11, wherein for at least one of the plural radio access technology types the message includes a first generation entry and a second generation entry, the first generation entry indicating whether a first generation of the at least one of the plural radio access technology types is supported by the node, the second generation entry indicating whether a second generation of the at least one of the plural radio access technology types is supported by the node.

14. The apparatus of claim 11, wherein for at least one of the plural radio access technology types the message includes a first frequency entry and a second frequency entry, the first frequency entry indicating whether a first frequency band of the at least one of the plural radio access technology types is supported by the node, the second frequency entry indicating whether a second frequency band of the at least one of the plural radio access technology types is supported by the node.

15. The apparatus of claim 10, wherein the mobile user equipment unit is configured to utilize the preferred network identifier in establishing a connection with the telecommunications network.

16. The apparatus of claim 10, wherein the preferred network identifier includes one of mobile country code and the mobile network code.

17. The apparatus of claim 10, wherein the message is transmitted on a common broadcast channel.

18. The apparatus of claim 17, wherein the message is a BCCH message.

19. The apparatus of claim 10, wherein the message includes a bitmap which has an entry for each of the plural services, each entry in the bitmap indicating one of support and non support for a respective service.

20. A method of operating a mobile telecommunications network comprising broadcasting, over an air interface, a message advising a mobile user equipment unit which one(s) of plural services are supported by the node, the method including:

formatting the message with plural service support fields for each of the corresponding plural services so that a mobile user equipment unit can ascertain therefrom which one(s) of plural services are supported by the node, each of the plural services being defined with reference to at least one of radio access technology type, generation, and radio frequency band, formatting the message to provide for each of the service support fields a corresponding preferred network identifier field.

21. The method of claim 20, further comprising inserting in the service support fields of the message entries for the corresponding plural services, each entry indicating one of support and non support for a respective service.

22. The method of claim 21, the step of formatting the message includes inserting in the message entries for plural radio access technology types in a predefined order.

23. The method of claim 21, comprising formatting the message further to include, for at least one of the plural radio access technology types, a first generation entry and a second generation entry, the first generation entry indicating whether a first generation of the at least one of the plural radio access technology types is supported by the node, the second generation entry indicating whether a second generation of the at least one of the plural radio access technology types is supported by the node.

24. The method of claim 21, comprising formatting the message further to include, for at least one of the plural radio access technology types, a first frequency entry and a second frequency entry, the first frequency entry indicating whether a first frequency band of the at least one of the plural radio access technology types is supported by the node, the second frequency entry indicating whether a second frequency band of the at least one of the plural radio access technology types is supported by the node.

25. The method of claim 20, wherein the preferred network identifier includes one of mobile country code and the mobile network code.

26. The method of claim 20, further comprising transmitting the message is on a common broadcast channel.

27. The method of claim 26, further comprising transmitting the message as a BCCH message.

28. The method of claim 20, comprising formatting the message to include a bitmap which has an entry for each of the plural services, each entry in the bitmap indicating one of support and non support for a respective service.

* * * * *